(12) United States Patent
Wendte et al.

(10) Patent No.: US 9,699,947 B2
(45) Date of Patent: Jul. 11, 2017

(54) TOOL SYSTEM FOR RESISTING ABRASIVE WEAR OF A GROUND ENGAGING TOOL OF AN AGRICULTURAL IMPLEMENT

(71) Applicant: CNH America, LLC, New Holland, PA (US)

(72) Inventors: Keith W. Wendte, Willowbrook, IL (US); Tracey D. Meiners, Mackinaw, IL (US); Robert A. Zemenchik, Kenosha, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/706,845

(22) Filed: Dec. 6, 2012

(65) Prior Publication Data

US 2013/0146317 A1 Jun. 13, 2013

Related U.S. Application Data

(60) Provisional application No. 61/567,915, filed on Dec. 7, 2011.

(51) Int. Cl.
*A01B 35/20* (2006.01)
*A01B 15/18* (2006.01)
*A01C 5/06* (2006.01)
*B82Y 30/00* (2011.01)

(52) U.S. Cl.
CPC .............. *A01B 35/20* (2013.01); *A01B 15/18* (2013.01); *A01C 5/062* (2013.01); *B82Y 30/00* (2013.01); *Y10S 977/902* (2013.01); *Y10T 29/49885* (2015.01)

(58) Field of Classification Search
USPC ........................................ 172/719, 747, 772
See application file for complete search history.

(56) References Cited

U.S. PATENT DOCUMENTS

| | | | |
|---|---|---|---|
| 1,960,879 A * | 5/1934 | Russell et al. | 172/713 |
| 1,965,950 A * | 7/1934 | Walker | 172/713 |
| 2,033,594 A * | 3/1936 | Stoody | 172/713 |
| 3,882,594 A * | 5/1975 | Jackson et al. | 228/122.1 |
| 5,111,600 A * | 5/1992 | Lukavich et al. | 37/452 |
| 5,456,323 A * | 10/1995 | Hill | 172/721 |
| 5,595,614 A | 1/1997 | McVicker | |
| 5,813,475 A * | 9/1998 | Bergan et al. | 172/719 |
| 5,954,147 A | 9/1999 | Overstreet et al. | |
| 6,258,402 B1 * | 7/2001 | Hussary et al. | 427/142 |
| 6,382,328 B1 * | 5/2002 | Beyer | 172/747 |
| 6,786,287 B2 * | 9/2004 | Pellenc et al. | 172/545 |
| D512,078 S * | 11/2005 | Poutre | D15/29 |
| 7,631,702 B2 * | 12/2009 | Hansen | 172/604 |
| 7,960,016 B2 | 6/2011 | Lechthaler et al. | |

(Continued)

*Primary Examiner* — Matthew D Troutman
(74) *Attorney, Agent, or Firm* — Rebecca L. Henkel; Rickard K. DeMille

(57) ABSTRACT

A tool system is provided for resisting abrasive wear of a ground-engaging tool of an agricultural implement during a crop production procedure. The tool system may include a tool for engaging an agricultural field while performing crop production procedure and that defines a main segment and a cutting segment having a working edge covered by a nanostructure coating. The cutting segment may include multiple wear zones with multiple working edges, respectively, covered by nanostructure coatings which may have different thicknesses.

9 Claims, 6 Drawing Sheets

(56) References Cited

U.S. PATENT DOCUMENTS

| | | |
|---|---|---|
| 2001/0015278 A1* | 8/2001 | Pellenc et al. .................. 172/45 |
| 2002/0073982 A1* | 6/2002 | Shaikh et al. ................ 123/688 |
| 2006/0166020 A1* | 7/2006 | Raybould et al. ............ 428/471 |
| 2006/0283609 A1* | 12/2006 | Hansen ........................ 172/604 |
| 2007/0098912 A1* | 5/2007 | Raybould et al. ............ 427/446 |
| 2007/0187153 A1 | 8/2007 | Bertagnolli |
| 2009/0065260 A1 | 3/2009 | Overstreet |
| 2009/0113726 A1 | 5/2009 | Ducros et al. |
| 2009/0152042 A1 | 6/2009 | Pierick et al. |
| 2009/0155479 A1 | 6/2009 | Xiao et al. |
| 2010/0011595 A1 | 1/2010 | Claus et al. |
| 2011/0177322 A1 | 7/2011 | Ogrin et al. |

* cited by examiner

TOOL SYSTEM FOR RESISTING ABRASIVE WEAR OF A GROUND ENGAGING TOOL OF AN AGRICULTURAL IMPLEMENT

CROSS-REFERENCE TO RELATED APPLICATION

The present application claims the benefit of U.S. Ser. No. 61/567,915 filed Dec. 7, 2011.

BACKGROUND OF THE INVENTION

The present invention relates generally to farm implements and, more particularly, to tillage implements.

One of the challenges constantly faced by farming and construction implement manufacturers is increasing the wear or usable life of working tools. Many of the soils in which such tools are used can be highly abrasive. In the context of farming implements, ground-engaging tools, which may include plow points, sweeps, shovels, knives, coulters, opener disks and other disks, and tines, depending on the type of implement, can experience substantial abrasive wear during use because the tools are continuously dragged through or across soil for long periods of time. Replacing tools that are abrasively worn out can be costly. As an example, for a tillage implement, as much as five percent of the implement's costs can be spent replacing tillage points each year.

Addressing the issue of premature wear on such ground-engaging tools has typically involved two approaches. In the first approach, design efforts have been made to improve how the tools are pulled through soil. In other words, improving wear life of the tool by changing the shape or geometry of the tool. The other approach has been to focus on the physical makeup of the tool, such as hard-facing which typically includes building up thicknesses at high wear areas with welding to deposit material that typically includes granular hard materials encapsulated in the weldment, which typically provides irregular surfaces to such tools at the high wear areas.

SUMMARY OF THE INVENTION

The present invention is directed to a tool system that includes an agricultural implement such as a tillage implement, planting implement, or seeding implement having one or more ground-engaging tools that are highly resistant to abrasive wear. The tools that are highly resistant to abrasive wear may include plow points, sweeps, shovels, knives, coulters, opener disks and other disks, and tines that may engage a field to perform a crop production procedure which may include residue management. The tools may have surfaces that are highly resistant to abrasive wear without introducing brittleness to the tools and which may operate at lower temperatures while being pulled through the soil of the field.

According to one aspect of the invention, a tool system for resisting abrasive wear of a ground-engaging tool of an agricultural implement during a crop production procedure is provided that includes an agricultural implement towable behind a tractor in an agricultural field for performing a crop production procedure. The agricultural implement includes a frame, a tool support extending from the frame, and a tool arranged with respect to the tool support for engaging the field while performing crop production procedure. The tool may be made from a metallic parent material and may define a mounting portion for supporting the tool from the tool support and a working edge spaced from the mounting portion for contacting at least one of crop residue, weeds, and soil of the field while the tool engages the field. A nanostructure coating covers the working edge of the tool, the nanostructure coating may include nanostructures providing a greater hardness value at the working edge of the tool than at the mounting portion of the tool. This may provide a tool that is highly resistant to abrasive wear at high wear locations of the tool.

According to another aspect of the invention, the nanostructure coating may define a first surface that is at least as smooth as a second surface defined at the mounting portion of the tool. This may provide a smooth hardened surface to portions of high-wear segments of agricultural tools that may provide a relatively low amount of friction between the tool and the soil that the tool is dragged through, which may lower the extent of friction-induced heating of the tool during use.

The nanostructure coating may include a tungsten carbide material. The nanostructure coating may be applied using a CGDS (Cold Gas Dynamic Spray) process. This may allow high-wear segments of the tool to be coated with a wear-resistant coating that can be applied with a non-thermal procedure which may allow the coating to be applied to relatively thin materials such as opener disks without warping or otherwise thermally compromising the integrity of such thin materials.

The tool may include a first wear zone and a second wear zone. The working edge and the nanostructure coating may define a first working edge and a first nanostructure coating, respectively, at the first wear zone. The second wear zone may define a second working edge and a second nanostructure coating overlying the second working edge. The second nanostructure coating may be thicker than the first nanostructure coating and may include more layers of a nanostructure material than the other one of the first and second nanostructure coatings. The first nanostructure coating may have at least two layers and the second nanostructure coating may have at least three layers. This may allow for a tool with hardened surfaces at portions of high-wear segments of agricultural tools without coating the entire tool and while providing an amount of coating that corresponds to the amount of wear at a particular area on the tool.

According to another aspect of the invention, the nanostructure coatings may be applied to each of the first and second wear zones such that each of the first and second wear zones has an appearance that is visually distinguishable from the parent material of the tool. A worn condition that indicates abrasive removal of the nanostructure coating may be determined by visual inspection in which at least one of the first and second wear zones has an appearance that is visually indistinguishable from the parent material of the tool. A color of at least one of the first and second wear zones and a color of the parent material may be compared to determine wear of the nanostructure coatings. A common color of at least one of the first and second wear zones and the parent material may indicate the condition indicating abrasive removal of the nanostructure coating. This may allow for quickly determining whether the nanostructure coating is intact between uses of the agricultural implement.

According to another aspect of the invention, the tool may be removed from the agricultural implement and the nanostructure coating may be reapplied to at least one of the first and second wear zones of the tool. The nanostructure coating may be reapplied to the cutting segment of the tool without applying the nanostructure coating to the main segment of the tool. This may allow for remanufacturing of the tools and may allow for a tool exchange program or remanufacture program. The tool may include a main segment and the mounting portion of the tool may be defined upon the main segment of the tool. The tool may include a cutting segment and the working edge may be defined upon the cutting segment of the tool. The cutting segment may be connected to the main segment so as to allow the cutting segment to be separated from the main segment for reapplication of the coating. This may allow for remanufacturing or an exchange program for the cutting segments of the tools.

According to another aspect of the invention, single-walled carbon nanostructures may be incorporated as the coating or into the steel that is used to form the tool. The incorporation of the nanostructures may increase the strength of the tool and may allow for significant weight reduction, i.e., as much as an 80% reduction in weight compared to typical tools. According to another aspect of the invention, filamentous carbon molecules may be used to form the nanostructures and may be produced without metal catalysts so as to provide an inexpensive alternative to the typical hard-surfacing treatments of agricultural ground-engaging tools. According to another aspect of the invention, the nanostructure coating is applied at a lower temperature and is harder, thinner, and smoother than typical hard-surfacing treatments of agricultural ground-engaging tools.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout and in which.

DETAILED DESCRIPTION

Figure 1:
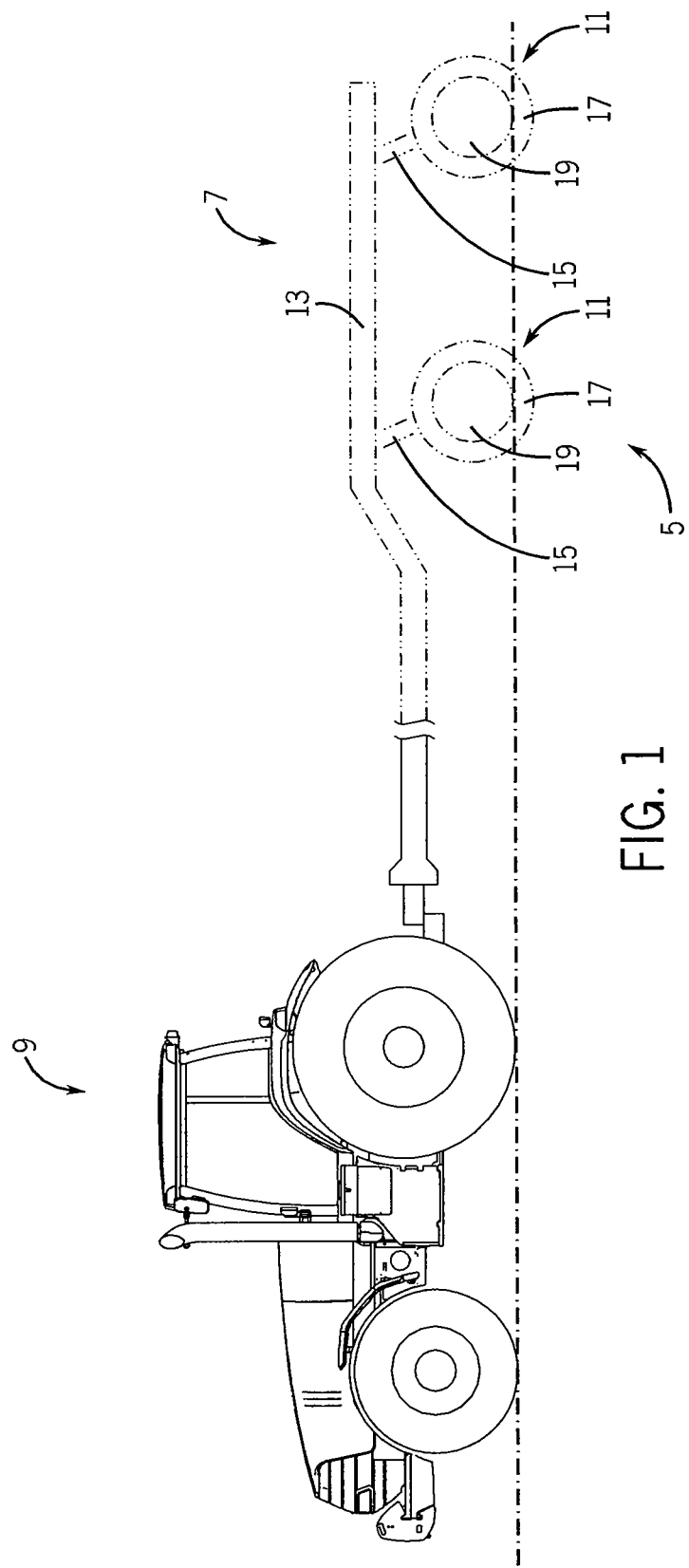
FIG. 1 is a side elevation of a tractor pulling a schematic representation of a tool system in accordance with the present invention.

Referring to FIG. 1, a tool system 5 is shown that includes an agricultural implement 7 which is towable behind a tractor 9 and is schematically shown. Although the simplified schematic implement 7 resembles a disk harrow, the implement 7 may be a chisel plow, ripper, or other tillage piece of equipment, as well as a planter, a seeder, or other piece of equipment that has at least one ground-engaging tool, schematically represented in FIG. 1 as tool 11. The tool 11 is supported from a frame 13 of the implement 7 by a tool support 15 that is configured based on the particular type of tool 11. As explained in greater detail elsewhere herein, the tool includes a nanostructure coating 17 that overlies parent material 19 at areas of the tool 11 that are susceptible to high abrasive wear.

Figure 2:
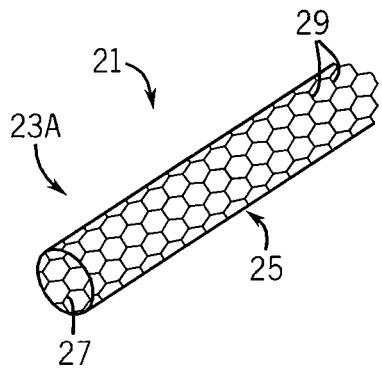
FIG. 2 is a simplified isometric view of a carbon-based nanostructure in accordance with the present invention.
Figure 3:
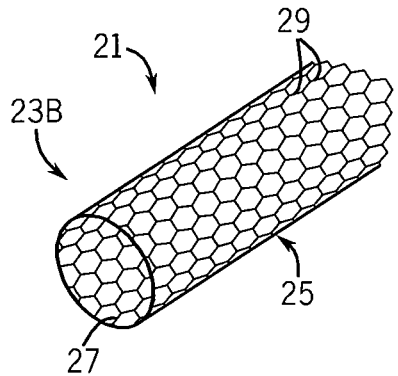
FIG. 3 is a simplified isometric view of a variant of the carbon-based nanostructure of FIG. 2.
Figure 4:
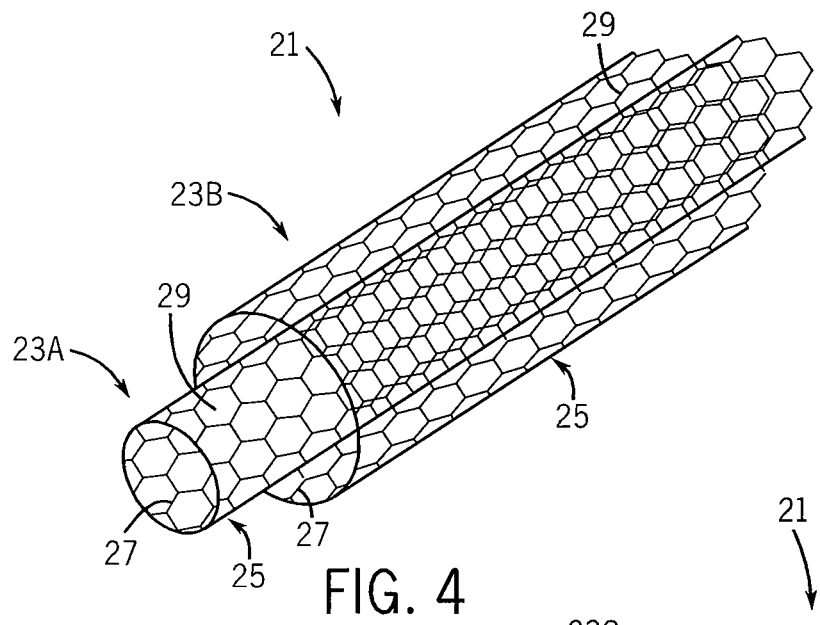
FIG. 4 is a simplified isometric view of another variant of the carbon-based nanostructure of FIG. 2.
Figure 5:
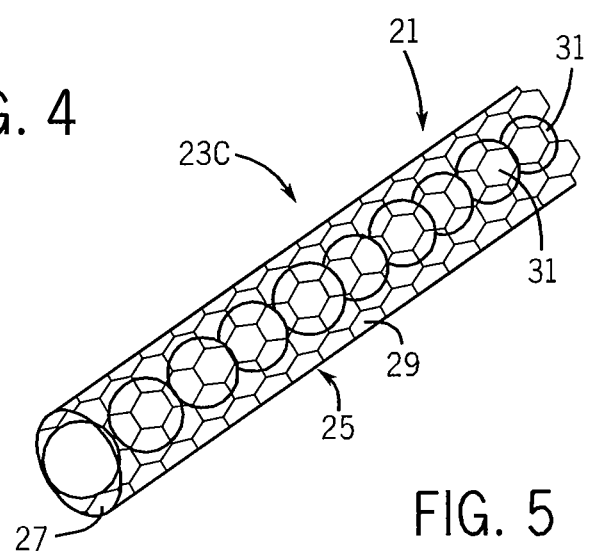
FIG. 5 is a simplified isometric view of another variant of the carbon-based nanostructure of FIG. 2.

Referring to FIGS. 2-5, the nanostructure coating 17 includes nanostructure materials 21 that are more resistant to abrasive wear than the parent material 19 (FIG. 1). The nanostructure materials 21 may include tungsten carbide arranged as filamentous carbon molecules that can be produced without metal catalysts and may include nanorods or nanotubes, shown schematically as nanotubes 23A-C. The nanotubes 23 A-C are shown as carbon-based structures but it is understood that non-carbon nanostructures could be used. FIGS. 2 and 3 show single-walled carbon nanotubes 23A-B that include elongate bodies 25 with elongate openings 27 formed by arrays of carbonaceous molecules 29 that, in the illustrated examples, form diamond-mesh patterns. Nanotube 23A of FIG. 2 has a relatively smaller diameter and nanotube 23B of FIG. 3 has a relatively larger diameter, including diameters of their respective openings 27. Referring to FIG. 4, the nanostructure material 21 is a composite of smaller and larger diameter nanotubes 23A-B of FIGS. 2 and 3. The smaller diameter nanotube 23A is arranged concentrically inside and extends beyond both ends of the larger diameter nanotube 23B. Referring now to FIG. 5, the nanostructure material 21 includes nanotubes 23C having metallic elements, such as metal atoms 31, bonded to the body 25 of the nanotubes 23C. These metal atoms 31 could be bonded to the nanotube body 25 using conventional chemical or mechanical bonding processes.

Figure 6:
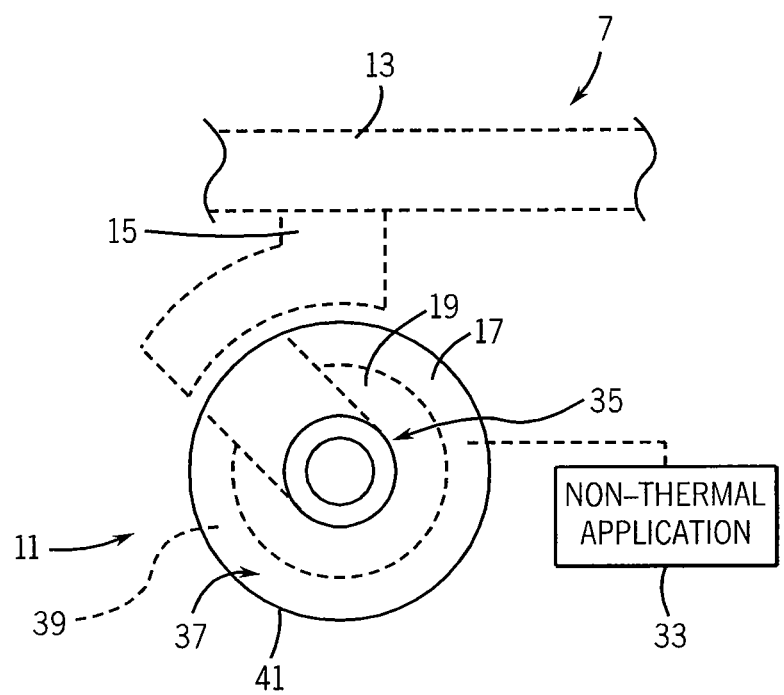
FIG. 6 is a simplified side elevation of a tool in accordance with the present invention.

Referring now to FIG. 6, the nanostructure coating 17 in this embodiment is applied to the tool 11 or a portion of the tool 11 by way of a non-thermal procedure 33. The non-thermal procedure 33 of application of the nanostructure coating 17 is sufficiently low in temperature and changes in temperature of the tool 11 during application by such a small amount that the metallic parent material 19 of the tool 11 avoids undergoing temperature-induced characteristic changes. Such temperature-induced characteristic changes include warping and changes in annealing, tempering, or hardening of the parent material 19 while applying the nanostructure coating 17. In one embodiment, the non-thermal procedure 33 includes application by way of a Cold Gas Dynamic Spray (CGDS) process. The CGDS process is a particle-coating process that accelerates gas to supersonic velocities through a De-Laval-type nozzle and carries the particles of the nanostructure materials 21 (FIGS. 2-5) to the parent material 19 for bonding in which particles of the nanostructure materials 21 are accelerated above a critical velocity by a supersonic flow through momentum transfer. Critical velocity of particles of the nanostructure materials 21 corresponds to an impact velocity that the particles of the nanostructure materials 21 could have to allow for successful bounding to the parent material 19. Regardless, the non-thermal procedure 33 allows for selective application of the nanostructure coating 17 to discrete portions of the tool 11, as well as to control thickness of the nanostructure coating 17 at such portions of the tool 11.

Still referring to FIG. 6, the tool 11 is shown as an opener disk for use with a planter. The tool 11 defines a mounting portion 35 that engages the tool support 15 for supporting the tool 11 from the implement 7. At least one cutting segment 37 is defined outwardly of the mounting portion 35. The cutting segment 37 includes at least one wear zone 39 that may engage the soil during use and have at least one working edge 41 that may cut and be susceptible to dulling or other abrasive wear during use.

Figure 7:
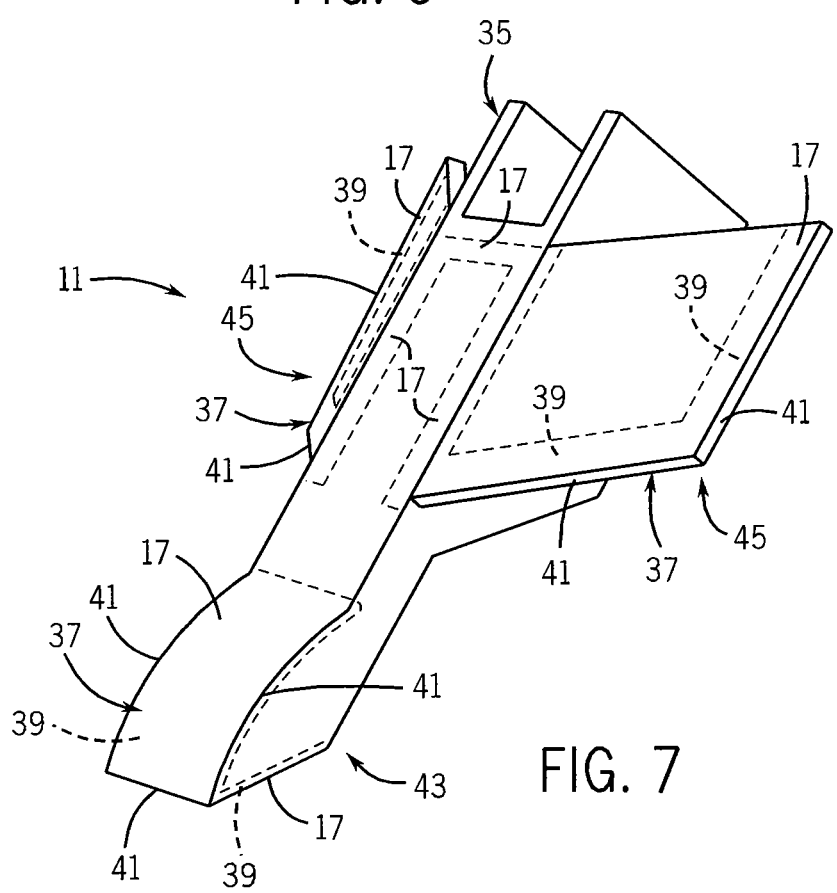
FIG. 7 is a simplified isometric view of another tool in accordance with the present invention.
Figure 8:
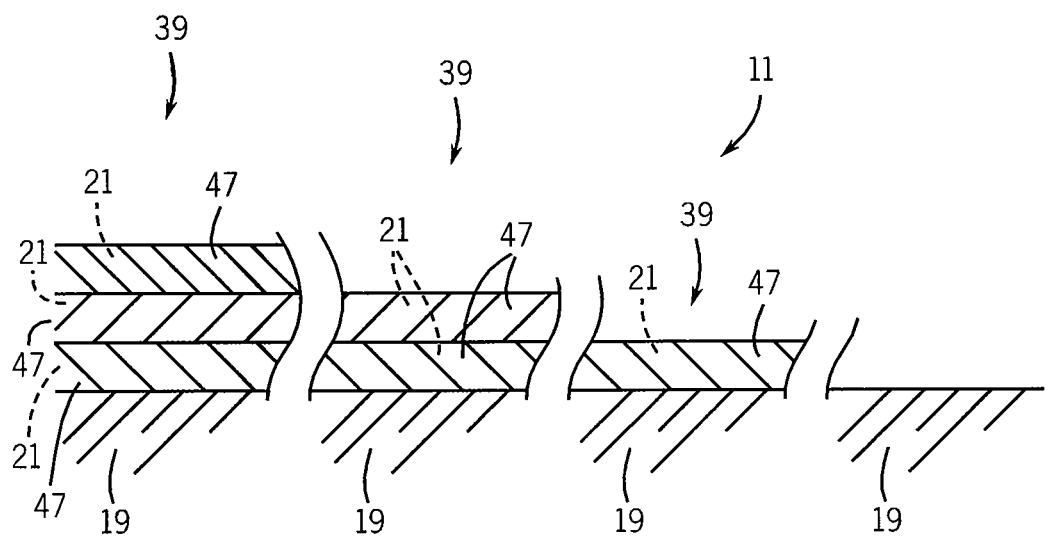
FIG. 8 is a cross-sectional view of various nanostructure coatings in accordance with the present invention.

Referring now to FIG. 7, the tool 11 is shown as a winged Tiger® point available from Case IH and which includes multiple cutting segments 37 which include at least one wear zone 39 and each having a nanostructure coating(s) 17. A first cutting segment 37 is defined at a leading tip end 43 and the other cutting segments 37 are defined at a pair of wings 45 toward the mounting portion 35. Referring now to FIGS. 7 and 8, different wear zones 39 may have coatings 17 of different thicknesses. The different thicknesses may be achieved by applying more of the nanostructure materials 21 (FIG. 2-5) during the non-thermal procedure 33 (FIG. 6) material in a single pass or, as shown in FIG. 8, by applying multiple and different numbers of layers 47 of the nanostructure materials 21 over the parent material 19. The wear zone 39 facing upwardly at the leading tip end 43 may include at least two layers 47 of the nanostructure materials 21 as represented by the second wear zone 39 from the left-hand side in FIG. 8. The wear zone 39 facing downwardly at the leading tip end 43 may include at least three layers 47 of the nanostructure materials 21 as represented by the wear zone 39 at the far left-hand side in FIG. 8. The wear zones 39 at the wings 45 may include at least two layers 47 of the nanostructure materials 21, optionally, a single layer 47 as represented by the wear zone 39 at the second to right-hand position of FIG. 8. The wear zones 39 of the wings 45 may be interconnected by a pair of segments of nanostructure coating(s) 17 that extend along the lines of intersection between the wings 45 and a main body 49 of the tool 11 and a segment of nanostructure coating(s) 17 that interconnects such pair of segments toward the mounting portion 35 of the tool 11. Although described as discrete layers, in another embodiment, the nanostructure coating 17 may be defined by carbon or other nanostructure material 21 that is integrally formed with at least portions of the steel or other metallic material(s) used to form the parent material 19 of the tools, preferably arranged so that the carbon nanostructures are concentrated at the high-wear areas such as the working edge(s) 41 or wear zone(s) 39.

Figure 10:
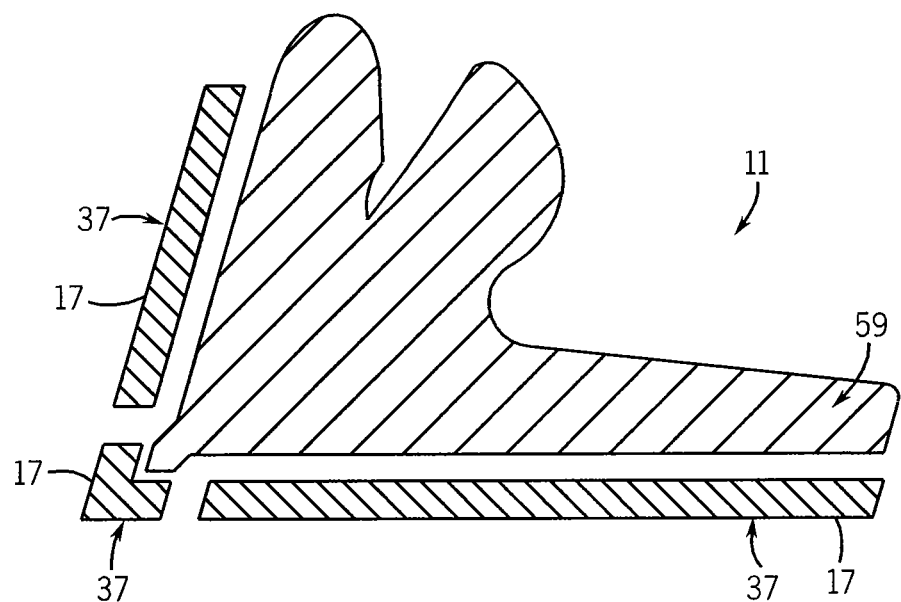
FIG. 10 is a simplified isometric view of a variant of the tool of FIG. 9.
Figure 9:
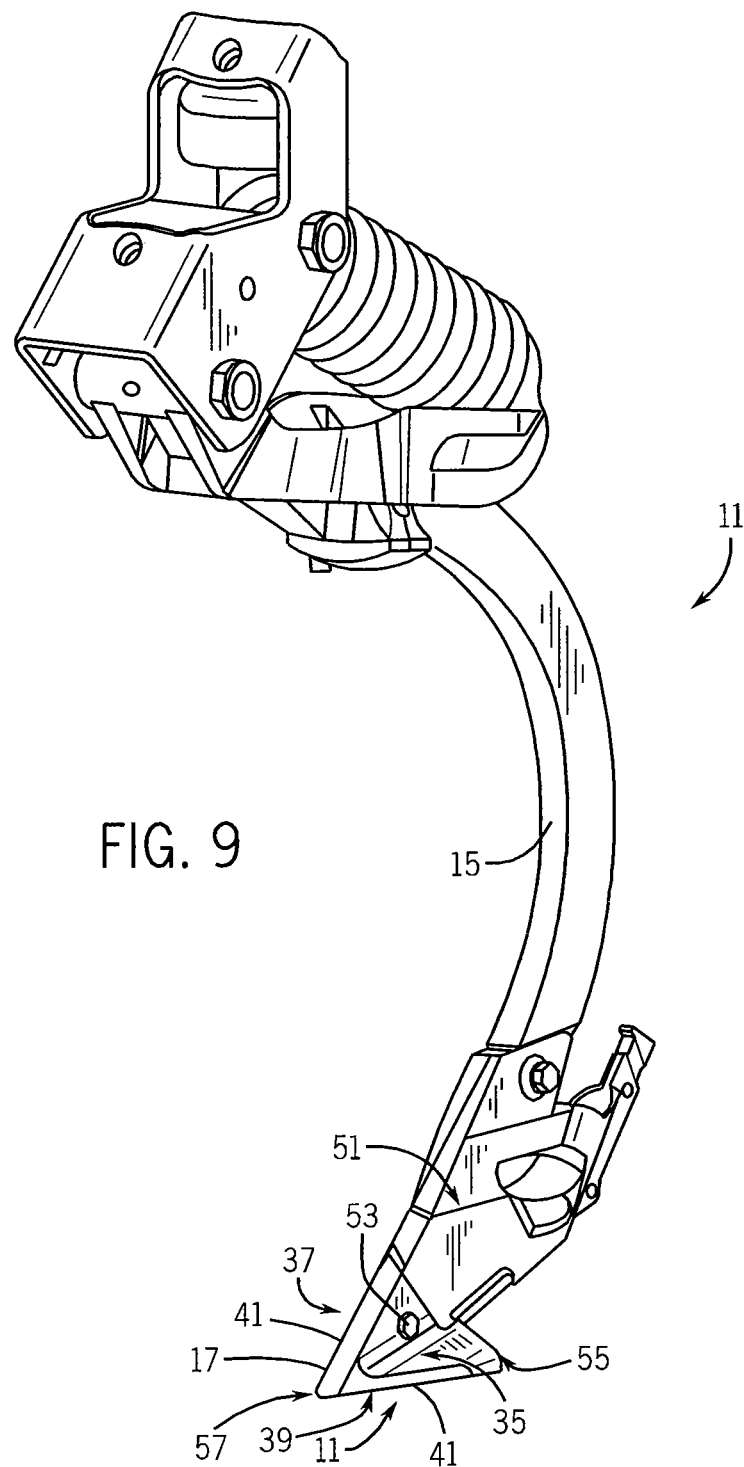
FIG. 9 is a simplified isometric view of another tool in accordance with the present invention.

Referring now to FIG. 9, instead of tool 11 being a disk or Tiger® point as in FIGS. 6 and 7, respectively, the tool 11 is a sweep that is mounted to a shank-type to tool support 15 by way of a cooperating adapter 51 and pin 53. This tool 11 defines an arrow-shaped body 55 with the cutting segment 37 defining a wear zone 39 having segments that converge toward each other and meet at a leading tip 57. As shown at the bottom-positioned working edge 41, the nanostructure coating(s) 17 may extend less than the entire length of the particular segment upon which it is arranged. Referring now to FIG. 10, like that of FIG. 9, the tool 11 of this embodiment is also a sweep. This tool 11 includes multiple cutting segments 37 that are individually connected to a main segment 59 of the tool 11. The cutting segments 37 may be connected to the main segment 59 as replaceable parts by way of fasteners and/or suitable bonding agents.

Figure 11:
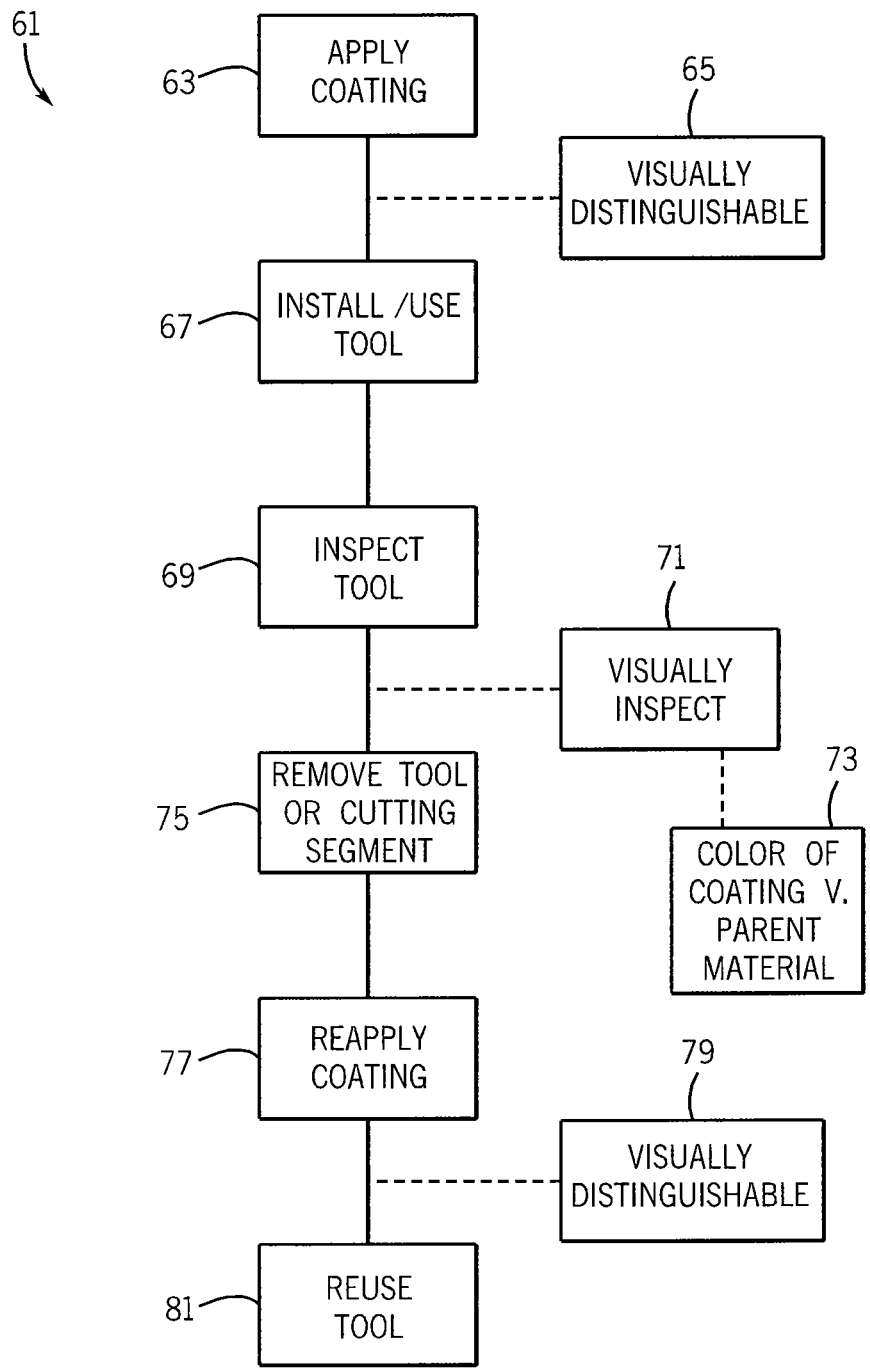
FIG. 11 is a flowchart of a procedure in accordance with the present invention.

Referring now to FIG. 11, the tool system 5 (FIG. 1) may be incorporated into a tool exchange program or remanufacture program, represented as program 61. Generally, with such a program 61, a tool 11 (FIG. 1) would be used until the nanostructure coating 17 is worn and the parent material 19 of the tool 11 is exposed. Thereafter, the tool 11 or cutting segment 37 would be removed from the implement and sent to a suitable facility for reapplication of the nanostructure coating 17. The remanufactured tool 11 could then be returned to the end-user for use or to a retailer to subsequently provide the remanufactured tool to the end-user.

Still referring to FIG. 11 and with reference to FIG. 6, at a suitable facility, the nanostructure coating 17 is applied to the tool 11 by way of the non-thermal procedure 33 (FIG. 6) represented by block 63 of FIG. 11. As represented by block 65 of FIG. 11, the nanostructure coating 17 may be visually distinguishable from the parent material 19. This may be done by leaving the parent material 19 in an at least somewhat unfinished state so that mill-scale or other minor surface irregularities are left on the parent material 19. Spray application of the nanostructure coating 17 over the parent material 19 may remove at least some of the mill-scale and/or otherwise provide a relatively smoother surface at the nanostructure coating 17 than at, and which looks different than, the adjacent parent material 19. Furthermore, the nanostructure materials 21 (FIGS. 2-5) may have different colors than a color of the parent material 19 so as to further provide a visually distinguishable nanostructure coating 17 when compared to the parent material 19. As represented by blocks 67 and 69, respectively, the tool 11 is installed on the implement 7, used, and then inspected for wear. As represented by block 71, the inspection may be a purely visual one in which the user can readily determine whether the nanostructure coating 17 has been removed by looking at the tool 11. As represented by block 73, a common color of the parent material 19 and the wear zone 39 may be indicative of the worn condition, indicating abrasive removal of the nanostructure coating 17. As represented by block 75, after determining that the nanostructure coating 17 has been recently removed from the tool 11, the tool 11 or the cutting segment(s) 37 is removed from the implement 7 or remainder of the tool 11. As represented by block 77, the tool 11 or cutting segments 37 are sent to a facility for reapplication of the nanostructure coating 17 by way of the non-thermal procedure 33 (FIG. 6). As represented by block 79, such reapplication provides another visually distinguishable nanostructure coating 17 from the parent material 19. As represented by block 81, the tool 11 is put back into use on an implement 7.

Many changes and modifications could be made to the invention without departing from the spirit thereof. The scope of these changes will become apparent from the appended claims.

We claim:

1. A method of using a wear resistant ground engaging tool comprising:

applying a first nanostructure coating to a first working edge at a first wear zone defined upon a tool having a metallic parent material of a first color by way of a non-thermal procedure so that the metallic parent material of the tool avoids undergoing temperature-induced characteristic changes while applying the first nanostructure coating, the first nanostructure coating having a generally uniform thickness, being a second color different from the first color and including nanostructures providing a greater hardness value at the first working edge of the tool than at a mounting portion of the tool that is spaced from the first working edge of the tool, wherein the first wear zone is arranged at one of an upwardly facing segment and a downwardly facing segment of the tool;

applying a second nanostructure coating to a second working edge at a second wear zone defined upon the tool such that the second nanostructure coating is separated from the first nanostructure by a portion of an outer surface of the ground engaging tool free of a nanostructure coating and including a plurality of surface irregularities to visually distinguish the portion free of the nanostructure coating from the first nanostructure coating applied to the first working edge and from the second nanostructure coating applied to the second working edge such that the portion of the outer surface of the ground engaging tool free of the nanostructure coating surrounds the second nanostructure coating, the second nanostructure coating being discontinuous with the first nanostructure coating and having a generally uniform thickness which differs from the thickness of the first nanostructure coating, wherein the second wear zone is arranged at the other one of the upwardly facing segment and the downwardly segment of the tool so that the first and second nanostructures coatings define different thicknesses at upwardly and downwardly facing segments of the tool;

attaching the tool to an agricultural implement by engaging the mounting portion of the tool with a tool support of the agricultural implement;

visually inspecting the first working edge of the tool to determine a worn condition, the worn condition being defined by at least a portion of the first wear zone having a color that is visually indistinguishable from the first color of the parent material of the tool; and removing the tool from the tool support of the agricultural implement for reapplication of the first nanostructure coating in response to a determination that the first working edge of the tool is in the worn condition.

2. The method of claim 1 further comprising applying more layers of a nanostructure coating material at the second wear zone so as to provide the second nanostructure coating at the second wear zone that is thicker than the first nanostructure coating at the first wear zone and wherein at least one of the first and second nanostructures coatings includes carbon nanotubes.

3. The method of claim 2 wherein at least two layers of the nanostructure coating is applied to the first working edge of the first wear zone and wherein at least three layers of the nanostructure coating are applied to the second working edge at the second wear zone.

4. The method of claim 1 wherein the second nanostructure coating is the second color and is visually distinguishable from first color of the parent material of the tool.

5. The method of claim 4 further comprising the additional step of visually inspecting the second working edge of the tool to determine a second worn condition, the second worn condition being defined by at least a portion of the second wear zone being a color that is visually indistinguishable from the first color of the parent material of the tool.

6. The method of claim 5 wherein the step of removing the tool from the tool support of the agricultural implement includes the additional step of reapplying the second nanostructure coating to the second wear zones of the tool in response to a determination that the second working edge of the tool is in the second worn condition.

7. The method of claim 1 further comprising:

engaging an agricultural field with the tool;

removing the tool from the agricultural implements; and reapplying the first nanostructure coating covering the first working edge of the tool.

8. The method of claim 7 wherein the tool includes a main segment having an outer surface defined by the metallic parent material and a cutting segment connected to the main segment and at which the first working edge of the tool is defined, and wherein the method further includes removing the cutting segment from the main segment and reapplying the first nanostructure coating to the cutting segment of the tool without applying the first nanostructure coating to the main segment of the tool.

9. The method of claim 1 wherein the tool includes a main segment having an outer surface defined by exposed metallic parent material and a cutting segment connected to the main segment and at which the first working edge of the tool is defined and the first nanostructure coating is arranged, the first nanostructure coating defining a coating surface that is at least as smooth as the exposed metallic parent material at the outer surface of the main segment.

* * * * *